US012790971B2

(12) United States Patent
Shibata et al.

(10) Patent No.: US 12,790,971 B2
(45) Date of Patent: Nov. 10, 2026

(54) METHOD FOR DETERMINING CONDITION OF EXHAUST SYSTEM, AND DEVICE FOR DETERMINING CONDITION OF EXHAUST SYSTEM

(71) Applicant: NISSAN MOTOR CO., LTD., Yokohama (JP)

(72) Inventors: Tohru Shibata, Kanagawa (JP); Mina Hoshino, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 104 days.

(21) Appl. No.: 18/994,514

(22) PCT Filed: Jul. 15, 2022

(86) PCT No.: PCT/JP2022/027803

§ 371 (c)(1), (2) Date: Jan. 14, 2025

(87) PCT Pub. No.: WO2024/013965

PCT Pub. Date: Jan. 18, 2024

(65) Prior Publication Data

US 2026/0258746 A1 Sep. 3, 2026

(51) Int. Cl.
*F01N 11/00* (2006.01)
*B60W 20/16* (2016.01)
(Continued)

(52) U.S. Cl.
CPC ........... *F01N 11/002* (2013.01); *B60W 20/16* (2016.01); *F01N 3/021* (2013.01); *F02D 41/029* (2013.01);
(Continued)

(58) Field of Classification Search
CPC ......... F02D 41/2403; F01N 2900/0421; F01N 11/00; F01N 11/002
See application file for complete search history.

(56) References Cited

U.S. PATENT DOCUMENTS 6,026,650 A * 2/2000 Beaverson ............ F25B 47/006 62/130
2015/0240696 A1* 8/2015 Saitou ................... F02D 41/148 73/114.76
2020/0284181 A1 9/2020 Matsumoto et al.

FOREIGN PATENT DOCUMENTS

CN 110469403 A * 11/2019 .............. F02B 77/08
CN 113775398 A * 12/2021 ............ F01N 11/005
(Continued)

*Primary Examiner* — Laert Dounis
(74) *Attorney, Agent, or Firm* — Foley & Lardner LLP

(57) ABSTRACT

A control unit determines whether icing has occurred in a pressure differential sensor that detects pressure loss of a gasoline particulate filter, or in an inlet-side pressure introduction pipe or an outlet-side pressure introduction pipe introducing pressure to the pressure differential sensor. Upon determining that icing has occurred, the control unit sets the count value of an icing cancelation counter to a prescribed initial value, and increases or decreases the count value from the initial value on the basis of the operating condition of an internal combustion engine, and when the count value reaches a prescribed threshold value for canceling the icing determination, determines that the icing has melted. The count value of the icing cancelation counter decreases while the internal combustion engine is temporarily stopped, and increases while the internal combustion engine is operating.

9 Claims, 3 Drawing Sheets

(51) Int. Cl.

| | |
|---|---|
| ***F01N 3/021*** | (2006.01) |
| ***F02D 41/02*** | (2006.01) |
| ***F02D 41/22*** | (2006.01) |
| ***F02D 41/24*** | (2006.01) |

(52) U.S. Cl.

CPC ....... *F02D 41/222* (2013.01); *F02D 41/2403* (2013.01); *F01N 2560/08* (2013.01); *F01N 2610/1486* (2013.01); *F01N 2900/0421* (2013.01); *F01N 2900/08* (2013.01); *F01N 2900/12* (2013.01)

(56) References Cited

FOREIGN PATENT DOCUMENTS

| | | | | | |
|---|---|---|---|---|---|
| EP | 2305977 | A1 | * | 4/2011 | ............. F01N 9/002 |
| JP | 11132026 | A | * | 5/1999 | |
| JP | 2006063868 | A | * | 3/2006 | |
| JP | 2012184756 | A | * | 9/2012 | |
| JP | 2015001182 | A | * | 1/2015 | |
| JP | 2020-143595 | A | | 9/2020 | |
| JP | 2021032197 | A | * | 3/2021 | ............. G01L 23/24 |
| WO | WO-2015128970 | A1 | * | 9/2015 | ........... F02D 41/148 |

* cited by examiner

METHOD FOR DETERMINING CONDITION OF EXHAUST SYSTEM, AND DEVICE FOR DETERMINING CONDITION OF EXHAUST SYSTEM

TECHNICAL FIELD

The present invention relates to an exhaust system state determination method and an exhaust system state determination device.

BACKGROUND ART

Patent Document 1 discloses a differential pressure sensor that measures a pressure loss at a gasoline particulate filter disposed in an exhaust pipe into which exhaust gas of an internal combustion engine is introduced.

Patent Document 1 determines whether at least one of an upstream pipe and a downstream pipe is in a frozen state, i.e., a state in which moisture inside the pipe(s) is frozen and may close the pipe(s), wherein the upstream pipe and the downstream pipe are structured to respectively transmit a pressure in an upstream side (i.e., an inlet side) and a pressure in a downstream side (i.e., an outlet side) of the gasoline particulate filter to the differential pressure sensor.

Patent Document 1 determines that at least one of the upstream pipe and the downstream pipe is in the frozen state, in case that an outside air temperature when an ignition switch is ON is lower than a predetermined first threshold, or in case that a water temperature when the ignition switch is ON is lower than a predetermined second threshold.

However, Patent Document 1 fails to consider a case of being frozen again after resolution of the frozen state during vehicle driving.

According to Patent Document 1, it is difficult to determine the frozen state again after the frozen state is once determined and then resolved. Patent Document 1 fails to suppose the case of being frozen again after resolution of the frozen state, and has a room for improvement in precise determination of the frozen state.

PRIOR ART DOCUMENT(S)

Patent Document(s)

Patent Document 1: JP 2020-143595 A

SUMMARY OF THE INVENTION

According to an aspect of the present invention, an exhaust system state determination method for an exhaust system including an internal combustion engine mounted in a vehicle and a differential pressure sensor structured to measure a pressure loss at an exhaust particulate filter disposed in an exhaust passage of the internal combustion engine includes: determining whether freezing in one of the differential pressure sensor and a path structured to introduce pressure into the differential pressure sensor is present, based on stopping status of the internal combustion engine; if the freezing is determined present, implementing steps of: setting a count value of a predetermined removal counter to a predetermined initial value; increasing or decreasing the count value of the predetermined removal counter from the initial value, based on an operational state of the internal combustion engine; and determining the freezing to have been melted, in response to satisfaction of a condition that the count value of the predetermined removal counter reaches a predetermined threshold; and setting the count value of the predetermined removal counter to be reversed in whether the count value increases or decreases, depending on whether the internal combustion engine is in temporary stopping or in operation, during driving of the vehicle with the freezing determined present.

The above aspect of the present invention serves to precisely determine melting of the freezing in the differential pressure sensor and the path structured to introduce pressure into the differential pressure sensor, during driving of the vehicle.

MODE(S) FOR CARRYING OUT THE INVENTION

Figure 1:
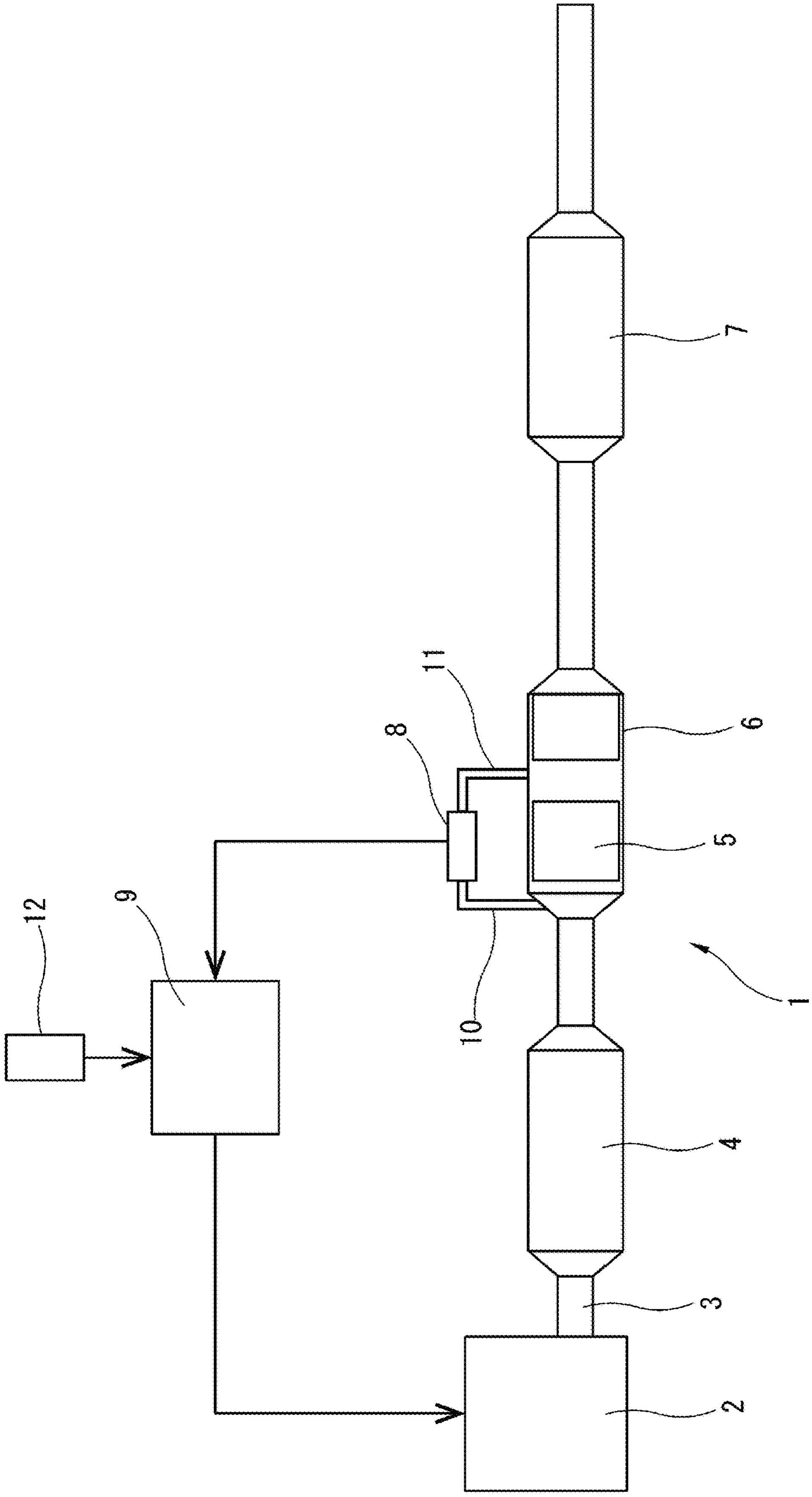
FIG. 1 is an illustrative view schematically showing an outline of an exhaust system to which the present invention is applied.

The following details an embodiment of the present invention with reference to the drawings. FIG. 1 is an illustrative view schematically showing an outline of an exhaust system 1 to which the present invention is applied.

Exhaust system 1 is mounted in a vehicle, and includes an internal combustion engine 2, an exhaust passage 3, a manifold catalyst 4, a Gasoline Particulate Filter (GPF) 5, an underfloor catalyst 6, a muffler 7, a differential pressure sensor 8, and a control unit 9. Differential pressure sensor 8 is structured to measure a pressure loss at GPF 5. Control unit 9 is configured to perform a freezing diagnosis described below.

Internal combustion engine 2 is a spark ignition type internal combustion engine fueled by gasoline and mounted in the vehicle such as an automobile.

Specifically, the vehicle including internal combustion engine 2 is an idle stop vehicle structured to perform idle stopping by an idle stop control or a hybrid vehicle structured to perform EV travel that is self-propelled travel with internal combustion engine 2 stopped. In other words, the vehicle including internal combustion engine 2 is a vehicle allowed to temporarily stop internal combustion engine 2 during vehicle driving.

The idle stop control is configured, for example, to suspend fuel supply and automatically stop internal combustion engine 2 in response to satisfaction of a predetermined automatic stop condition, and resume the fuel supply and restart internal combustion engine 2 in response to satisfaction of a predetermined automatic restart condition during the automatic stopping.

The predetermined automatic stop condition is, for example, that a vehicle speed is lower than a predetermined value, an accelerator opening degree is less than a predetermined value, etc. The predetermined automatic restart condition is, for example, that the accelerator opening degree is greater than a predetermined value, a brake pedal is not depressed, etc.

The hybrid vehicle is structured to perform the EV travel that drives drive wheels with use of only a drive motor (not shown) as a drive source, and may be a so-called series hybrid vehicle structured not to use internal combustion engine 2 as a power source of the vehicle or a so-called parallel hybrid vehicle structured to use internal combustion engine 2 as a power source of the vehicle.

Manifold catalyst 4 is exemplarily a three-way catalyst, and is structured to purify exhaust gas. Manifold catalyst 4 is disposed relatively nearly to a combustion chamber (not shown) of internal combustion engine 2, e.g., disposed immediately downstream with respect to an aggregation part of an exhaust manifold.

GPF 5 and underfloor catalyst 6 are disposed under a floor of a living room of the vehicle, apart from the combustion chamber (not shown) of internal combustion engine 2. In other words, GPF 5 and underfloor catalyst 6 are disposed apart from an engine room of the vehicle.

GPF 5 corresponds to an exhaust particulate filter, and is structured to collect Particulate Matter (PM) contained in exhaust gas. GPF 5 is disposed downstream with respect to manifold catalyst 4.

Underfloor catalyst 6 is exemplarily a three-way catalyst, and is structured to purify exhaust gas. Underfloor catalyst 6 is disposed downstream with respect to GPF 5, adjacently to GPF 5.

Muffler 7 is structured to reduce exhaust noise, and is disposed downstream with respect to underfloor catalyst 6.

Differential pressure sensor 8 is structured to measure a pressure difference between an exhaust pressure at an inlet of GPF 5 and an exhaust pressure at an outlet of GPF 5. The exhaust pressure at the inlet of GPF 5 is introduced into differential pressure sensor 8 via an inlet pressure-introduction pipe 10. The exhaust pressure at the outlet of GPF 5 is introduced into differential pressure sensor 8 via an outlet pressure-introduction pipe 11. Inlet pressure-introduction pipe 10 and outlet pressure-introduction pipe 11 correspond to paths structured to introduce pressure into differential pressure sensor 8.

Control unit 9 is a known digital computer including a CPU, a ROM, a RAM, and an input/output interface. Control unit 9 receives measurement signals (i.e., output signals) from various sensors such as the differential pressure sensor 8, a crank angle sensor 12, and a sensor structured to measure an air-fuel ratio of internal combustion engine 2. Crank angle sensor 12 is structured to measure a crank angle of a crank shaft of internal combustion engine 2, and can measure an engine speed of internal combustion engine 2.

Control unit 9 is configured to calculate an amount of deposit of exhaust particles collected in GPF 5. In detail, control unit 9 compares a first deposit amount calculated based on the output signal of differential pressure sensor 8 with a second deposit amount calculated based on operational status of internal combustion engine 2, and determines that the deposit amount of exhaust particulates is a larger one of the first deposit amount and the second deposit amount. The first deposit amount is a deposit amount calculated based on the pressure loss at GPF 5. The second deposit amount is a deposit amount calculated based on a physical model employing, for example, histories of the air fuel ratio, the engine speed, etc. of internal combustion engine 2.

Furthermore, control unit 9 is configured to control internal combustion engine 2 and implement various diagnoses.

Exhaust gas (i.e., burnt gas) flowing in exhaust passage 3 contains moisture. Thus, differential pressure sensor 8, inlet pressure-introduction pipe 10, and outlet pressure-introduction pipe 11 are in an environment containing moisture. Under an extremely low temperature such as an outside air temperature below the freezing point, differential pressure sensor 8 and inlet pressure-introduction pipe 10 and outlet pressure-introduction pipe 11, which are the paths for pressure introduction into differential pressure sensor 8, may be frozen. For example, in case that one of differential pressure sensor 8, inlet pressure-introduction pipe 10, and outlet pressure-introduction pipe 11 is frozen, the output signal of differential pressure sensor 8 fails to have a value representing the differential pressure at that moment, even without a failure in differential pressure sensor 8. This may cause a trouble in various controls and various diagnoses employing the output signal of differential pressure sensor 8. In other words, even without a failure in differential pressure sensor 8, the freezing in differential pressure sensor 8 and the paths for pressure introduction into differential pressure sensor 8 causes the output signal of differential pressure sensor 8 to deviate from a true value that should be originally outputted at that moment, and may cause a trouble in various controls and various diagnoses employing the output signal of differential pressure sensor 8.

If the freezing in differential pressure sensor 8 and the paths for pressure introduction into differential pressure sensor 8 can be precisely detected, various controls and various diagnoses employing the output signal of differential pressure sensor 8 are suppressed from undergoing a malfunction or a wrong diagnosis.

The various controls employing the output signal of differential pressure sensor 8 include, for example, a GPF 5 regeneration control performed based on the amount of deposit of exhaust particles in GPF 5. In case that the freezing causes an output signal of GPF 5 to deviate from a true value and causes the first deposit amount described above to be calculated as a value greater than it actually is, the GPF 5 regeneration control may fail to be appropriately performed. This may result in deterioration of GPF 5.

The various diagnoses employing the output signal of differential pressure sensor 8 include, for example, a failure diagnosis on differential pressure sensor 8 itself and a diagnosis on whether GPF 5 is installed in exhaust passage 3 or detached from exhaust passage 3. In case that the output signal of GPF 5 deviates from the true value due to the freezing, the failure diagnosis may wrongly determine GPF 5 to be out of order. Furthermore, in case that the output signal of GPF 5 deviates from the true value due to the freezing, the diagnosis may wrongly determine GPF 5 to be detached from exhaust passage 3, even if GPF 5 is actually installed in exhaust passage 3.

In view of the foregoing, the present invention discloses precisely determining the freezing in differential pressure sensor 8 and the paths for pressure introduction into differential pressure sensor 8, and suspending various controls and various diagnoses employing the output signal of differential pressure sensor 8, in response to abnormality in output of differential pressure sensor 8 due to the freezing, and thereby avoiding a malfunction and a wrong diagnosis.

The freezing determination is performed by control unit 9 serving as a determination section. Control unit 9 determines whether any one of differential pressure sensor 8, inlet pressure-introduction pipe 10, and outlet pressure-introduction pipe 11 is frozen, based on stopping status of internal combustion engine 2 mounted in the vehicle. In other words, control unit 9 determines whether the freezing in one of differential pressure sensor 8 and the paths structured to introduce pressure into differential pressure sensor 8 is present. Specifically, control unit 9 determines that the freezing in one of differential pressure sensor 8, inlet pressure-introduction pipe 10, and outlet pressure-introduction pipe 11 is present, in response to satisfaction of conditions that: internal combustion engine 2 has been temporarily stopped for a predetermined time period or longer; and the outside air temperature during the temporary stopping of internal combustion engine 2 is equal to or lower than a predetermine temperature. The predetermined temperature is exemplarily 0° C.

The outside air temperature may be estimated from, for example, a measurement signal of an air flow meter not shown. In another manner, the outside air temperature may be obtained from a temperature sensor separately disposed for measurement of the outside air temperature.

In case that the outside air temperature upon key-ON start of the vehicle is equal to or lower than the predetermined temperature, the freezing in one of differential pressure sensor 8 and the paths for pressure introduction into differential pressure sensor 8 is determined present.

Control unit 9 determines the output signal of differential pressure sensor 8 to deviate from the true value, and suspends various controls and various diagnoses employing the output signal of differential pressure sensor 8, in response to satisfaction of a condition that the freezing in one of differential pressure sensor 8, inlet pressure-introduction pipe 10, and outlet pressure-introduction pipe 11 is present.

Control unit 9 sets a count value of a freezing removal counter (which corresponds to a predetermined removal counter) to a predetermined initial value, in response to satisfaction of a condition that the freezing determination determines that the freezing is present. The freezing removal counter is a parameter corresponding to a total amount of heat sent from internal combustion engine 2 to GPF 5. Control unit 9 increases or decreases the count value of the freezing removal counter from the initial value, based on an operational state of internal combustion engine 2 (i.e., whether internal combustion engine 2 is in operation or in temporary stopping). In response to satisfaction of a condition that the count value of the freezing removal counter reaches a predetermined freezing removal threshold, control unit 9 determines that the freezing in differential pressure sensor 8 and the paths structured to introduce pressure into differential pressure sensor 8 has been melted. In other words, in response to satisfaction of the condition that the count value of the freezing removal counter reaches the predetermined freezing removal threshold, control unit 9 determines that differential pressure sensor 8, inlet pressure-introduction pipe 10, and outlet pressure-introduction pipe 11 are not frozen.

The initial value of the count value of the freezing removal counter is less than the freezing removal threshold by a predetermined amount set beforehand. In other words, the initial value of the count value of the freezing removal counter is set to be constant in difference from the freezing removal threshold. Furthermore, the initial value of the count value of the freezing removal counter is set within a range equal to or greater than zero and less than the freezing removal threshold.

Incidentally, the freezing removal threshold is set to have a value that does not become zero even after subtracting the predetermined amount from the freezing removal threshold.

The count value of the freezing removal counter is set to increase during temporary stopping of internal combustion engine 2 (i.e., in case of an engine speed being 0 rpm) and decrease during operation of internal combustion engine 2 (i.e., in case of an engine speed being not 0 rpm), during vehicle driving with the freezing determined present. In other words, the count value of the freezing removal counter is set to be reversed in whether the count value increases or decreases, depending on whether internal combustion engine 2 is in temporary stopping or in operation, during vehicle traveling with the freezing determined present.

The count value of the freezing removal counter does not become smaller than zero.

Control unit 9 determines the output signal of differential pressure sensor 8 to represent the true value, and resumes the various controls and the various diagnoses employing the output signal of differential pressure sensor 8, in response to satisfaction of a condition that differential pressure sensor 8, inlet pressure-introduction pipe 10, and outlet pressure-introduction pipe 11 are not frozen.

Exhaust system 1 according to the above embodiment serves to precisely determine melting of the freezing in differential pressure sensor 8 and the paths for pressure introduction into differential pressure sensor 8, during vehicle driving.

Figure 2:
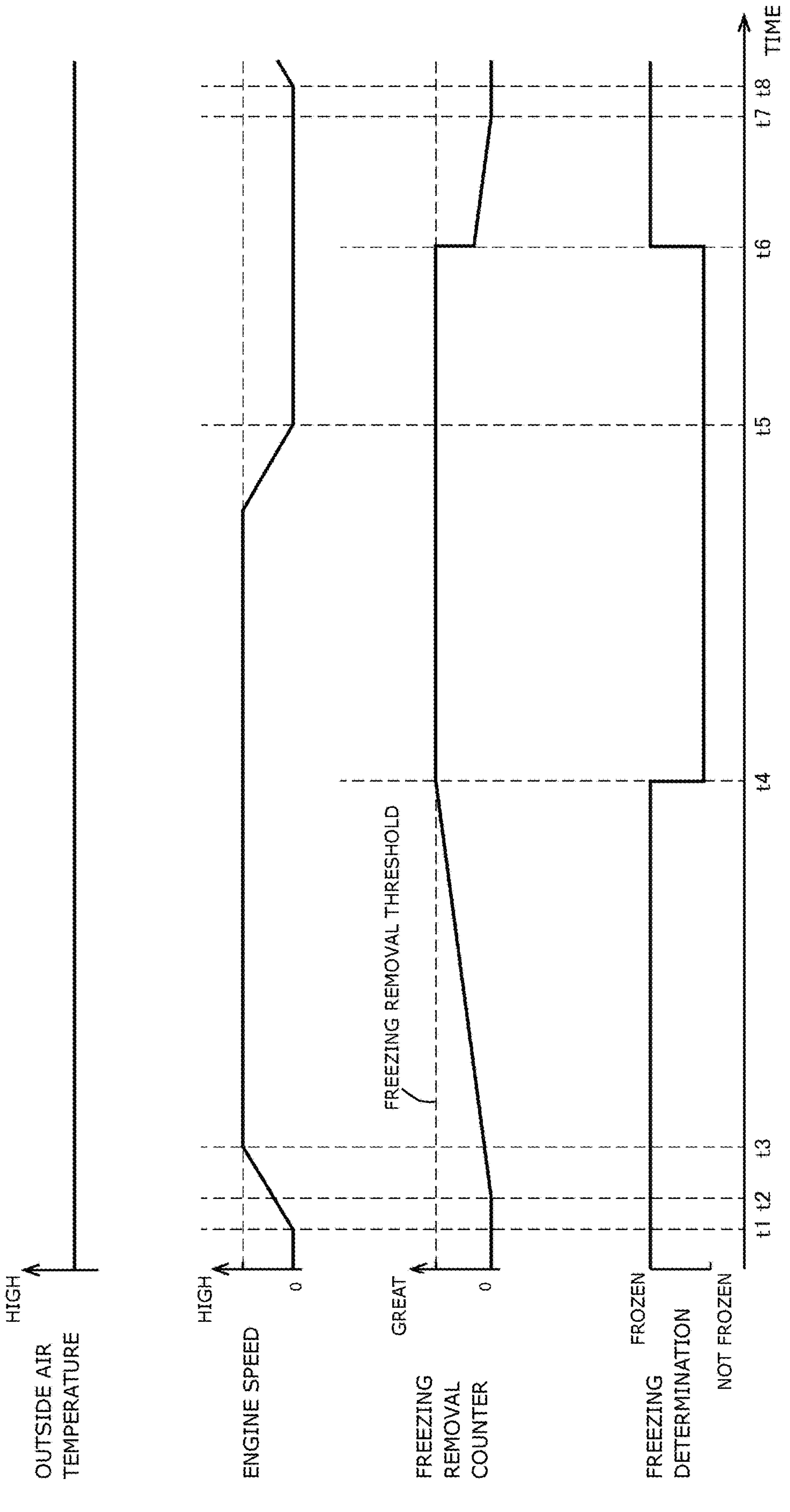
FIG. 2 is a timing chart showing how freezing determination is performed.

FIG. 2 is a timing chart showing an example of how the freezing determination is performed in case that the outside air temperature is constant at a temperature equal to or lower than the predetermined temperature.

Time instant t1 is a timing at which internal combustion engine 2 is started with the initial value of the count value of the freezing removal counter set to zero.

Time instant t2 is a timing at which the freezing removal counter starts to be counted up (i.e., incremented) from the initial value. The count value of the freezing removal counter starts to increase from time instant t2. In a low engine speed region, internal combustion engine 2 fails to supply a sufficient amount of heat to exhaust system 1 because of smallness in intake air amount and exhaust air amount in such region. In view of this, the count value of the freezing removal counter is maintained at the initial value (i.e., the current value) without being increased or decreased, until time instant t2 at which the engine speed of internal combustion engine 2 reaches a predetermined engine speed after restarting internal combustion engine 2. This allows exhaust system 1 to more precisely determine the melting of the freezing.

Time instant t3 is a timing at which the engine speed reaches the predetermined target engine speed.

Time instant t4 is a timing at which the count value of the freezing removal counter reaches the freezing removal threshold, and the freezing determination determines the freezing to be absent.

Time instant t5 is a timing at which the engine speed becomes zero during vehicle driving, and internal combustion engine 2 stops.

Time instant t6 is a timing at which the predetermined time period has passed from the timing of the stopping of internal combustion engine 2, and the freezing determination determines the freezing to be present. The predetermined time period may be set depending on the outside air temperature: e.g., may be set to be shorten with decrease in outside air temperature.

In detail regarding time instant t6, control unit 9 includes a timer configured to measure a duration time period of temporary stopping of internal combustion engine 2, and the timer starts to be counted up (i.e., incremented) from time instant t5, and a count value of the timer reaches a predetermined re-freezing threshold (which corresponds to the predetermined time period above) at time instant t6. The re-freezing threshold may be changed depending on the outside air temperature: e.g., may be set to decrease with decrease in outside air temperature.

Furthermore at time instant t6, the counter value of the freezing removal counter is set to the initial value.

Time instant t7 is a timing at which the count value of the freezing removal counter having decreased due to continuation of the temporary stopping of internal combustion engine 2 becomes zero. Within a period from time instant t6 to time instant t7, internal combustion engine 2 is stationary, and the count value of the freezing removal counter is accordingly counted down (i.e., decremented) from the initial value and thereby gradually decreases.

Time instant t8 is a timing at which internal combustion engine 2 is started.

Figure 3:
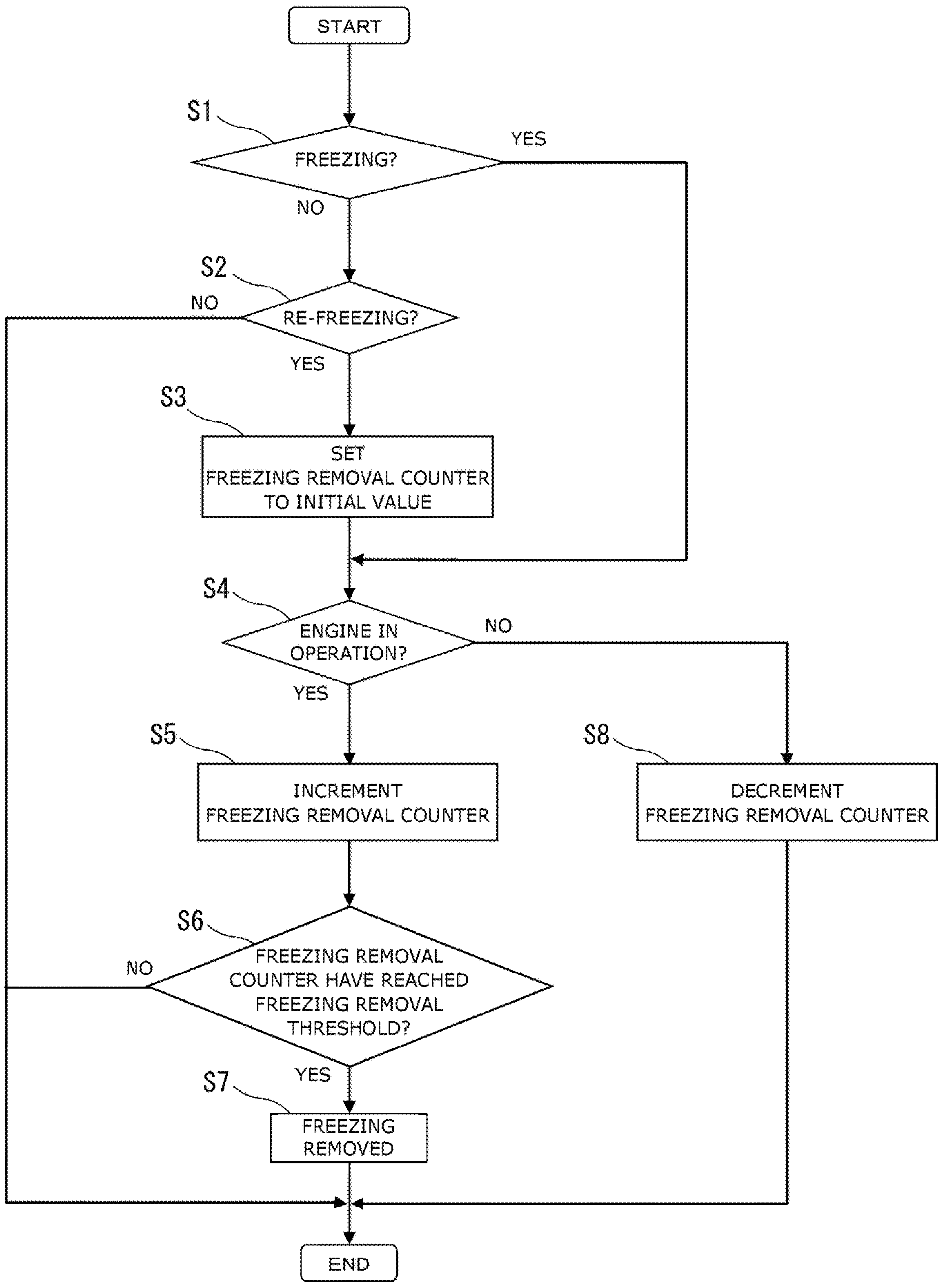
FIG. 3 is a flow chart showing a flow of the freezing determination.

FIG. 3 is a flow chart showing a flow of the freezing determination in exhaust system 1 according to the above embodiment.

Step S1 determines whether the freezing in one of differential pressure sensor 8 and the paths structured to introduce pressure into differential pressure sensor 8 has been determined to be present. In other words, step S1 determines whether a determination that any one of differential pressure sensor 8 and the paths structured to introduce pressure into differential pressure sensor 8 is frozen is already present. If step S1 determines the freezing to be present, step S4 is subsequently executed. If step S1 determines the freezing to be absent, step S2 is subsequently executed.

Step S2 determines whether any one of differential pressure sensor 8 and the paths structured to introduce pressure into differential pressure sensor 8 is frozen. In other words, step S2 determines whether re-freezing in one of differential pressure sensor 8 and the paths structured to introduce pressure into differential pressure sensor 8 is present. If step S2 determines the re-freezing to be present, step S3 is subsequently executed. If step S2 determines the re-freezing to be absent, the routine this time is terminated.

Step S3 sets the count value of the freezing removal counter to the initial value.

Step S4 determines whether internal combustion engine 2 is in operation (i.e., is rotating). If step S4 determines internal combustion engine 2 to be in operation, step S5 is subsequently executed. If step S4 determines internal combustion engine 2 to be stationary (i.e., be zero in engine speed), step S8 is subsequently executed.

Step S5 increments the count value of the freezing removal counter.

Step S6 determines whether the count value of the freezing removal counter has reached the freezing removal threshold. If step S6 determines the count value of the freezing removal counter to have reached the freezing removal threshold, step S7 is subsequently executed. If step S6 determines the count value of the freezing removal counter to have not reached the freezing removal threshold, the routine this time is terminated.

Step S7 determines that the freezing in differential pressure sensor 8 and the paths structured to introduce pressure into differential pressure sensor 8 has been removed (i.e., melted). In other words, step S7 determines that the freezing in differential pressure sensor 8 and the paths structured to introduce pressure into differential pressure sensor 8 has been resolved.

Step S8 decrements the count value of the freezing removal counter, and terminates the routine this time.

The above describes the specific embodiment of the present invention. However, the present invention is not limited to the above embodiment, but may be variously modified within scope of the technical ideas of the invention.

For example, internal combustion engine 2 may be a diesel engine. The exhaust particulate filter is not limited to GPF 5, but may be a Diesel Particulate Filter (DPF).

The above embodiment shows that the freezing removal counter is set to regard the amount of heat supplied to GPF 5 as a positive value and the amount of heat discharged from GPF 5 as a negative value. However, the freezing removal counter may be set to regard the amount of heat supplied to GPF 5 as a negative value and the amount of heat discharged from GPF 5 as a positive value.

The freezing removal counter may be set to be maintained constant at the current value even during operation of internal combustion engine 2, in case of fuel cut suspending fuel supply to internal combustion engine 2 or in case of a vehicle speed equal to or higher than a predetermined speed. For example, when setting the freezing removal counter to regard the amount of heat supplied to GPF 5 as a positive value, the count value of the freezing removal counter may be set to be maintained at the current value without being increased even during operation of internal combustion engine 2, in case of the fuel cut suspending fuel supply to internal combustion engine 2 or in case of a vehicle speed equal to or higher than the predetermined speed.

This improves exhaust system 1 in precision in the determination of the melting of the freezing.

In case that exhaust system 1 according to the present invention is mounted in a vehicle destination of which is not an arctic region, the freezing removal counter may be set to be maintained constant at the current value during temporary stopping of internal combustion engine 2. For example, when setting the freezing removal counter to regard the amount of heat supplied to GPF 5 as a positive value, in case that exhaust system 1 according to the present invention is mounted in a vehicle destination of which is not an arctic region, the freezing removal counter may be set to be maintained at the current value without being reduced during temporary stopping of internal combustion engine 2.

In case that the destination is not an arctic region, the freezing would not progress even during temporary stopping of internal combustion engine 2, once the freezing is resolved due to starting of internal combustion engine 2.

This further improves exhaust system 1 in precision in the determination of the melting of the freezing.

The initial value of the count value of the freezing removal counter is set to approach the freezing removal threshold with decrease in duration time period of temporary stopping of internal combustion engine 2 with the freezing determined present. For example, when setting the freezing removal counter to regard the amount of heat supplied to GPF 5 as a positive value, the initial value of the count value of the freezing removal counter is set to increase with decrease in duration time period of temporary stopping of internal combustion engine 2 with the freezing determined present.

This further improves exhaust system 1 in precision in the determination of the melting of the freezing.

The initial value of the count value of the freezing removal counter may be set to a value (e.g., zero) the farthest from the freezing removal threshold, in case that the duration time period of temporary stopping of internal combustion engine 2 with the freezing determined present is longer than a predetermined duration time period. In other words, the initial value of the count value of the freezing removal counter may be set to a value most deviated from the freezing removal threshold within a settable range of the initial value, in case that the duration time period of temporary stopping of internal combustion engine 2 with the freezing determined present is longer than the predetermined duration time period.

The initial value of the freezing removal counter does not need correction in case of a long duration time of temporary stopping of internal combustion engine 2: e.g., in case of turning OFF an ignition key and stopping internal combustion engine 2 at night and turning ON the ignition key and starting internal combustion engine 2 the next morning.

This allows exhaust system 1 to set the initial value of the freezing removal counter to a value suitable for an actual manner of use.

The freezing removal threshold may be set depending on the outside air temperature. Specifically, the freezing removal threshold may be set to decrease with increase in outside air temperature.

The above embodiment is directed to an exhaust system state determination method and an exhaust system state determination device for exhaust system 1.

The invention claimed is:

1. An exhaust system state determination method for an exhaust system including an internal combustion engine mounted in a vehicle and a differential pressure sensor structured to measure a pressure loss at an exhaust particulate filter disposed in an exhaust passage of the internal combustion engine, the exhaust system state determination method comprising:

determining whether freezing in one of the differential pressure sensor and a path structured to introduce pressure into the differential pressure sensor is present, based on stopping status of the internal combustion engine;

if the freezing is determined present, implementing steps of: setting a count value of a predetermined removal counter to a predetermined initial value; increasing or decreasing the count value of the predetermined removal counter from the initial value, based on an operational state of the internal combustion engine; and determining the freezing to have been melted, in response to satisfaction of a condition that the count value of the predetermined removal counter reaches a predetermined threshold; and setting the count value of the predetermined removal counter to be reversed in whether the count value increases or decreases, depending on whether the internal combustion engine is in temporary stopping or in operation, during driving of the vehicle with the freezing determined present.

2. The exhaust system state determination method as claimed in claim 1, the method further comprising:

determining that the freezing in one of the differential pressure sensor and the path is present, in response to satisfaction of conditions that: the internal combustion engine has been temporarily stopped for a predetermined time period or longer, during driving of the vehicle; and an outside air temperature is equal to or lower than a predetermined temperature.

3. The exhaust system state determination method as claimed in claim 1, the method further comprising:

maintaining the count value of the predetermined removal counter to be constant at a current value even during operation of the internal combustion engine, in response to satisfaction of one of conditions that: an intake air amount of the internal combustion engine is equal to or less than a predetermined value; the internal combustion engine is under fuel cut that suspends fuel supply to the internal combustion engine; and a vehicle speed of the vehicle is equal to or greater than a predetermined speed.

4. The exhaust system state determination method as claimed in claim 1, the method further comprising:

maintaining the count value of the predetermined removal counter to be constant at a current value during temporary stopping of the internal combustion engine, if destination of the vehicle is not an arctic region.

5. The exhaust system state determination method as claimed in claim 1, the method further comprising:

setting the initial value of the count value of the predetermined removal counter to approach the predetermined threshold with decrease in duration time period of temporary stopping of the internal combustion engine with the freezing determined present.

6. The exhaust system state determination method as claimed in claim 1, the method further comprising:

setting the initial value of the count value of the predetermined removal counter to a value the farthest from the predetermined threshold, if a duration time period of temporary stopping of the internal combustion engine with the freezing determined present is longer than a predetermined time period.

7. The exhaust system state determination method as claimed in claim 1, wherein the temporary stopping of the internal combustion engine is performed by idle stopping.

8. The exhaust system state determination method as claimed in claim 1, wherein:

the vehicle is structured to perform EV travel that is self-propelled travel with the internal combustion engine stopped; and the temporary stopping of the internal combustion engine is performed during the EV travel.

9. An exhaust system state determination device for an internal combustion engine mounted in a vehicle, the exhaust system state determination device comprising:

an exhaust particulate filter disposed in an exhaust passage of the internal combustion engine;

a differential pressure sensor structured to measure a pressure loss at the exhaust particulate filter; and a determination section configured to:

determine whether freezing in one of the differential pressure sensor and a path structured to introduce pressure into the differential pressure sensor is present, based on stopping status of the internal combustion engine;

if the freezing is determined present, implement steps of: setting a count value of a predetermined removal counter to a predetermined initial value; increasing or decreasing the count value of the predetermined removal counter from the initial value, based on an operational state of the internal combustion engine; and determining the freezing to have been melted, in response to satisfaction of a condition that the count value of the predetermined removal counter reaches a predetermined threshold, wherein the count value of the predetermined removal counter is set to be reversed in whether the count value increases or decreases, depending on whether the internal combustion engine is in temporary stopping or in operation, during driving of the vehicle with the freezing determined present.

* * * * *